United States Patent
Arai et al.

Patent Number: 5,888,036
Date of Patent: Mar. 30, 1999

[54] DRILL BIT AND STEP FEEDING METHOD

[75] Inventors: Kunio Arai, Atsugi; Yasuhiko Kanaya, Machida, both of Japan

[73] Assignee: Hitachi Seiko, Ltd., Ebina, Japan

[21] Appl. No.: 899,149

[22] Filed: Jul. 23, 1997

Related U.S. Application Data

[63] Continuation of Ser. No. 498,110, Jul. 5, 1995, abandoned, which is a continuation of Ser. No. 64,937, May 24, 1993, abandoned, which is a continuation of Ser. No. 485,488, Feb. 27, 1990, abandoned.

[51] Int. Cl.⁶ .................................................. B23B 51/02
[52] U.S. Cl. .......................................... 408/230; 408/704
[58] Field of Search .................................... 408/230, 704

[56] References Cited

U.S. PATENT DOCUMENTS

| | | | |
|---|---|---|---|
| 4,080,093 | 3/1978 | Maier | 408/230 |
| 4,561,813 | 12/1985 | Schneider | 408/230 |
| 4,759,667 | 7/1988 | Brown | 408/230 |
| 4,872,787 | 10/1989 | Arai et al. | 408/95 |
| 4,915,550 | 4/1990 | Arai et al. | 408/95 |
| 4,932,815 | 6/1990 | Krauss | 408/230 |

FOREIGN PATENT DOCUMENTS

| | | | |
|---|---|---|---|
| 1062503 | 4/1957 | France | 76/108.6 |
| 0114407 | 6/1985 | Japan | 408/230 |
| 0050706 | 3/1986 | Japan | 408/230 |
| 0306112 | 12/1989 | Japan | 408/704 |
| 8400910 | 3/1984 | WIPO | 408/230 |

*Primary Examiner*—Steven C. Bishop
*Attorney, Agent, or Firm*—Antonelli, Terry, Stout & Kraus, LLP

[57] ABSTRACT

An improved drill bit for high speed, small diameter drilling of printed circuit boards uses flute/land ratio tapering in combination with the appropriate web thickness and point, cutting or flute angles to obtain high quality, accurately positioned holes. In one embodiment, the web thickness at the tip is 15% of the drill diameter, the flute/land ratio is 2.0, the tip angle is 130°, the second cutting angle is 20°, the third cutting angle is 30°, the flute angle is 32°, the relief groove depth is 0.001", body length is 0.256" and the distance between the body end and the flute end is 0.01". Such a bit is used in connection with an air jet cooling/cleaning system and a step feed drilling method wherein the first step is between four-six times drill diameter, the second step is between two-three times the drill diameter, and the third step and subsequent steps are between 1.5–2.5 times the drill diameter.

9 Claims, 16 Drawing Sheets

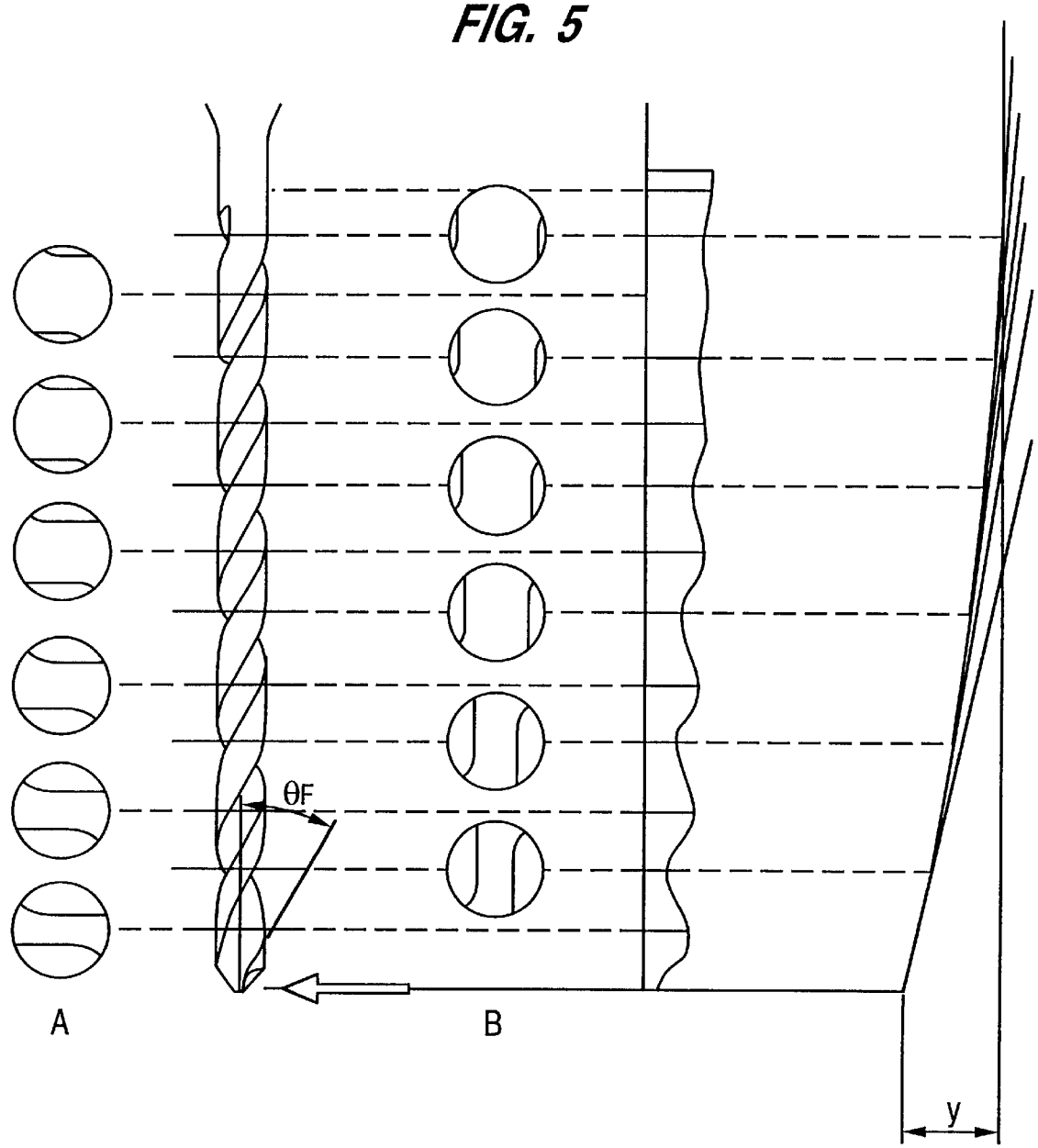

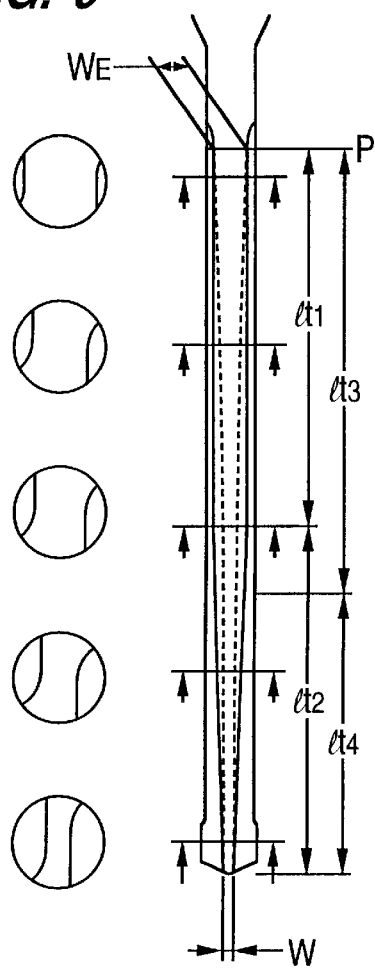
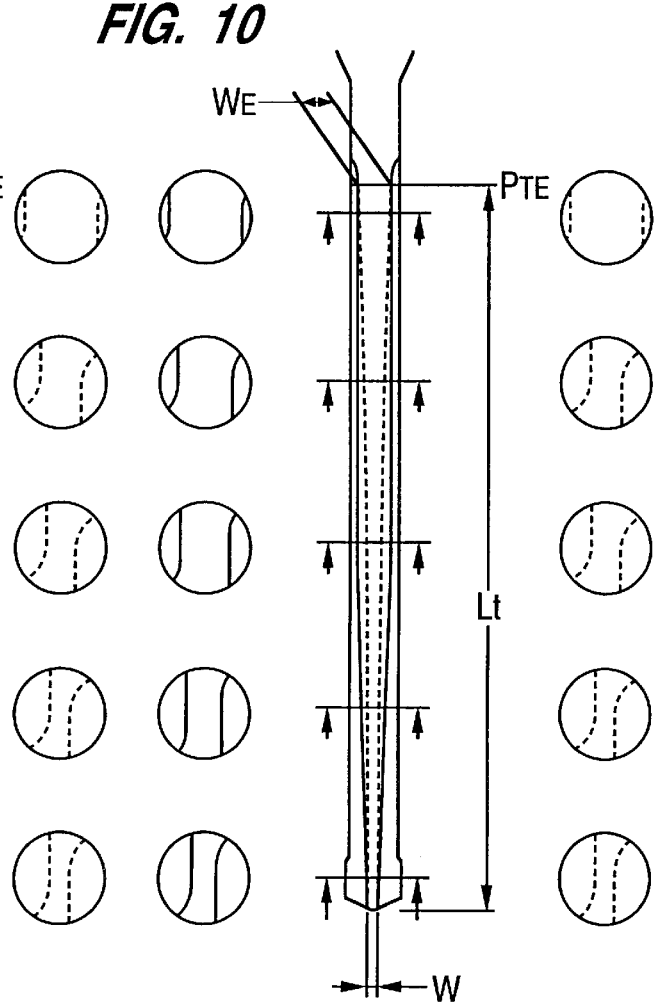
FIG. 9
FIG. 10

BURR (BELL BOTTOM)
OVERCUTTING  SMEAR

INNER LAYER NUMBER

DRILL BIT 0.4 mm DIA.  PWB  FR4 GLASS EPOXY
SPINDLE SPEED 75 Kpm  mm THICK
CHIP LOAD  mm/REV.  34 LAYERS
THRUST LOAD
DRILLING DIRECTION

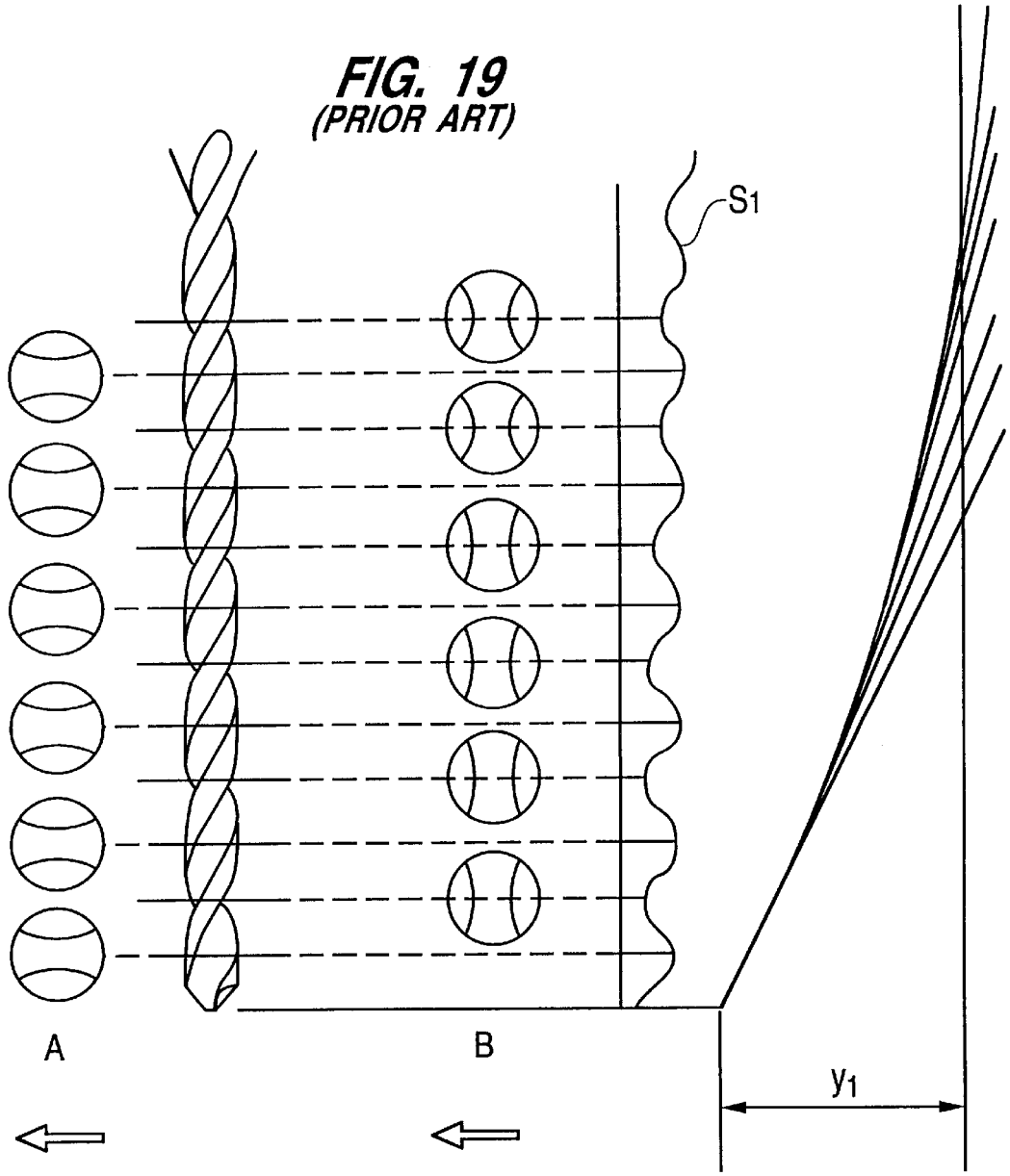

DRILL BIT AND STEP FEEDING METHOD

This application is a continuation application of Ser. No. 08/498,110, filed Jul. 5, 1995, now abandoned which was a continuation of application Ser. No. 08/064,937, filed May 24, 1993, now abandoned which was a continuation of application Ser. No. 07/485,488 filed Feb. 27, 1990 and now abandoned.

BACKGROUND OF THE INVENTION

The present invention relates to an improved drill bit construction and step feeding method and, more particularly, to a drill bit, including current straight-type and undercuttype drills, whose geometry and construction, such as flute/land ratio tapering, decrease positional error and tip deflection and improve hole quality. The step feeding method in accordance with the present invention includes controlling the size of each step in a specific relationship to prevent clogging of the drill flute.

In conventional high speed, high aspect ratio drilling of single or stacked printed circuit boards (PCBs) W as shown in FIGS. 17A–17D, the boards are held by a circular pressure pad 21, and air is suctioned through a hole or opening 23 in the pressure pad 21 to remove chips from the grooves of the drill bit 3 through a low pressure evacuation conduit 22. FIG. 17A shows the pressure pad 21 clamping the board or boards W with the drill bit 3 in the workpiece, while FIG. 17C is an enlarged portion of the drill bit on the board(s) showing the flow of air and the chip in the flute. FIG. 17B shows the drill bit 3 removed from the board(s) W and the pressure pad 21 above the board(s) in noncontacting relationship, while FIG. 17D is an enlarged portion of the drill tip showing clogging of the flute. With this "vacuum cleaner" method, the differential pressure cannot exceed one atmosphere; consequently, air flow velocity is not sufficient to clean badly clogged drill bits, and hole roughness and resin smear usually occur as a result.

As shown in FIGS. 18A, 18B, when the aspect ratio (i.e. depth/hole diameter) is eight or more, and not all the chips are removed from the bit as is the case in FIGS. 17A–17D, the drill thrust load increases with hole depth. The resultant drill bending results in hole position deviation at the bottom of the board stack, hole enlargement. Furthermore, hole smear can occur due to heating of the drill.

A step feed method of the general type shown in FIGS. 14A, 14B has made high aspect ratio drilling possible by greatly reducing or eliminating drill clogging. As is more fully described in U.S. Pat. No. 4,872,787, the depth of each drilling step (where each step is designated by a circled numeral) is selected such that serious drill clogging does not occur. After each thrust ①–③, ⑤ and ⑦ the drill is withdrawn, thereby removing the chips and cleaning the drill bit flute. Step feeding is repeated so that drilling of the board(s) occurs a little deeper each time occurs.

Conventional high aspect drill bits are illustrated in FIGS. 19 to 21. A typical drill diameter is 0.016", the web thickness is approximately 15% of the drill diameter, the flute/land ratio is approximately 2.0, the web taper is 1.5 to 2.0 per 100, the flute angle is 30° to 35°, the material is K30 cemented carbide. We have found that the body length and flute length are either too long or too short for drilling printed circuit boards (PCBs). Chip clogging is a problem as shown in FIGS. 17A–17B, and to avoid this problem in some drills, the relief $N_2$ shown in FIG. 21 is doubled to 0.002" from the relief $N_1$, of FIG. 20. This expedient greatly increases, however, drill breakage and degrades positional accuracy and hole quality. Moreover, there is undesirable stress concentration at the flute end which constitutes also the body or shank end.

When such a drill bit is used for step feed drilling of the type shown in FIGS. 14A and 14B, the second moment of cross sectional area shown by the sinuous curve $S_1$ in FIG. 19 demonstrates that there is very little difference between the cross section at the drill tip and the cross section at the shank end, so that resonance-related vibration, spindle runout, errors in centering the drill point, roughness on upper and lower board surfaces, resistance caused by glass filament bundles, and clogging of the drill flute can cause a radial load and a force in the direction of the arrow resulting in drill bending or even breakage. The second moment of area varies sinuously along the length of the drill at the positions shown at B going through several minimums which are essentially constant along the length of the drill bit. The amount of deflection, $y_1$, is inversely proportional to the number and size of these minimums. In other words, the smaller the sizes are in magnitude, the larger the deflection.

Furthermore, the Young's modulus of K30 material is low. If the elastic limit is exceeded, permanent deformation results. When drilling a stack of three boards, each board being about 0.063" thick, the deviation of the hole at the bottom surface of the lower board due to drill bending can be large, thereby resulting in holes not centered in conductor lands and in unacceptably high board rejects. In addition, when the step feed method is used, damage to the edge of the hole will occur each time the drill is withdrawn and reinserted if the drill is permanently deformed.

FIG. 7 shows the drill tip deflection due to bending when a bending force is applied to the tip of different types of bit, and FIG. 8 shows the change in hole positioning error with the number of holes drilled, in this case the hole error at the rear of the stack of three PCBs. Curves D and E in each figure represent deflection and error for, respectively, conventional drill bits, and it can be seen that they are unacceptably high. Conventional drill bits use a constant or almost parallel taper as shown in Japanese LaidOpen Publication No. 61-50706 where the lead angle is in excess of 26°, the depth of the flute start is 70 to 80% of the drill bit radius and the flute end depth is 50 to 80% of the drill bit radius.

Another form of conventional drill bit employs a solid material with a flute/land ratio at the flute end of more than one (1) whereas the web taper range is from 0.1/100 to 5/100 as described in Japanese Laid-Open Publication No. 59-156719.

A known drill bit utilizing a flute cross-sectional radius which becomes larger toward the flute end of the bit is also described in Japanese Laid-Open Publication No. 61-226209. The flute angle remains constant throughout in this device.

Another known type of drill is shown in Japanese Laid-Open Publication No. 60-61110 which is characterized by a lead angle which becomes smaller toward the flute end toward the flute start of the shank. This configuration does not disclose a taper or the concept of the lead angle of the flute start being greater than the lead angle of the flute end.

There is nothing in the foregoing types of drill bits which overcomes the problems and disadvantages encountered in high speed, high aspect ratio drilling in terms of hole smearing, tip deflection and hole positional error.

SUMMARY OF THE INVENTION

It is an object of the present invention to overcome the problems and disadvantages encountered in prior drill bits and drilling methods.

It is another object of the present invention to provide a new and improved drill bit construction which decreases positional error and tip deflection in small diameter holes where positional error is of particular concern.

It is still another object of the present invention to provide a drill bit which improves hole quality.

Yet another object of the present invention is to construct a high speed, high aspect ratio drill bit which minimizes resonance-related vibration and clogging which can cause radial loads resulting in drill bending or even breakage.

Still a further object of the present invention is to configure a drill bit such that the second moment of area is essentially constant toward the end of the drill and the tip deflection is minimized.

An additional object of the present invention is to provide a step feeding method, particularly in conjunction with a known air jet cleaning and cooling method, in which clogging can be greatly reduced, if not eliminated, by controlling the size of each step.

We have found that for small-diameter, high-aspect-ratio drilling, the effect of drilling speed, drill bit shape and material on drill breakage and reliability, hole positional errors or accuracy, and hole quality are extremely important and directly affect the number of rejects.

We have further found that the foregoing objects can be achieved by means of a new drill bit construction with flute/land ratio tapering particularly adapted for high aspect ratio step feed drilling with an air jet cleaning/cooling system.

To solve the problems encountered in conventional drill bits, we have discovered what the size of first, second, third and later drilling steps should be and further what the appropriate drill tip shape, flute cross section and the like must be to obtain the small diameter, high quality holes.

In particular, in the drilling process according to the present invention, the first step size or distance in terms of drill diameter, D, is four to six times D; for the second step the distance is two to three times D, and for the third and later steps it is 1.5 to 2.5 times D.

We have ascertained the flute/land ratio, the web thickness and point, cutting and lead or flute angles which achieve the objects of the present invention. We found that if the web thickness is small at the tip and increased towards the shank end as described hereinafter and shown in FIG. 5, then the tip deflection or, alternatively, the drilling error, will be greatly decreased. We also found the appropriate relief size and body length for such a drill bit.

It is thus possible to greatly decrease positional error which results in holes deviating considerably from the center of a conductor pad in PCBs, radius damage to hole edges caused by drill bending, and hole roughness and smear when a three-board stack of PCBs is drilled.

BRIEF DESCRIPTION OF THE DRAWINGS

These and other features, objects and advantages of the present invention will become more apparent from the following detailed description of presently preferred embodiments when taken in conjunction with the accompanying drawings wherein:

FIG. 5 is an elevational view of a drill bit in accordance with the present invention illustrating the effect of increased web thickness on deflection in terms of the second moment of area;

FIG. 9 is an elevational view of another embodiment of the drill bit of the present invention wherein a composite taper consists of two linear tapers;

FIG. 10 is an elevational view of yet another embodiment of the drill bit of the present invention utilizing a power-law taper;

FIG. 19 is an elevational view similar to FIG. 5 but showing a conventional drill bit and the deflection of same in terms of the second moment of area.

DESCRIPTION OF PRESENTLY PREFERRED EMBODIMENTS

Figure 13:
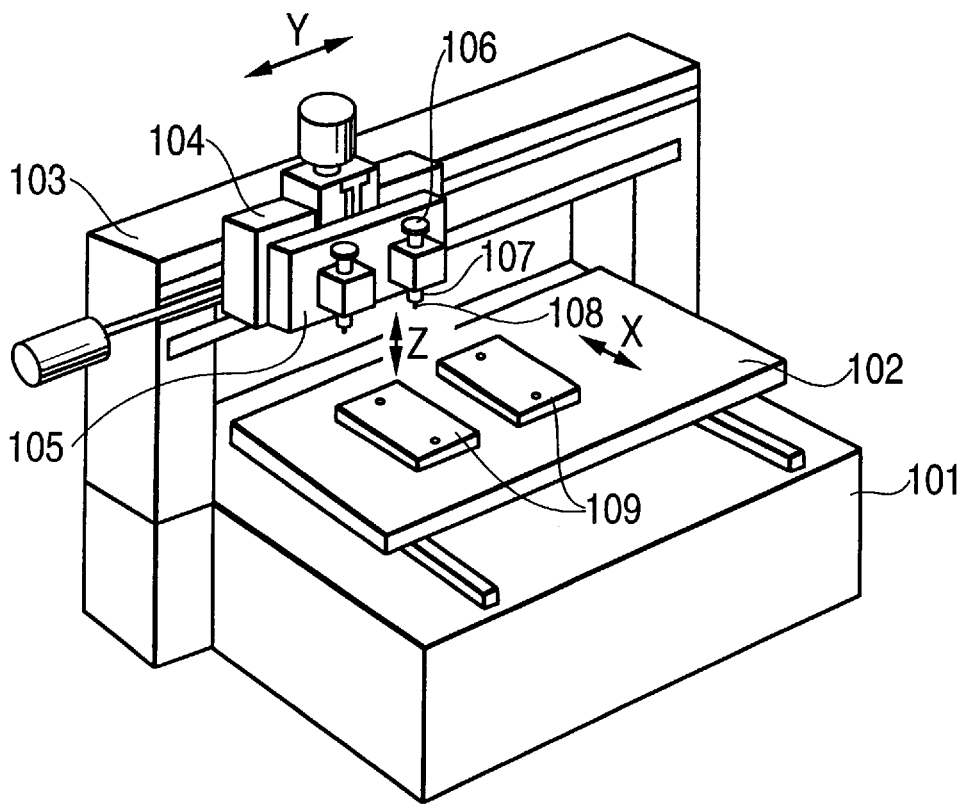
FIG. 13 is an isometric view of the drilling machine used for mounting the drill bits shown in FIGS. 1, 5, 9, 10, 11 and 12.

Referring now to the drawings and, in particular to FIG. 13, there is shown a drilling machine of the general type used in step feed drilling for high speed, small diameter drilling of PCBs and the like. A machine bed 101 supports a table 102 which is movable in an X-direction as indicated by a first arrow. A column or frame 103 carries a spindle carriage 104 which is movable in a Y-direction as indicated by a second arrow. The spindle carriage 104 carries a drilling head 105 which is movable in a Z-direction as indicated by a third arrow. Single or stacked PCBs 109 are mounted on the table 102 and are held by a conventional pressure foot 107 through which a drill 108 held in a spindle can perform the step feed drilling operation.

Figure 15A:
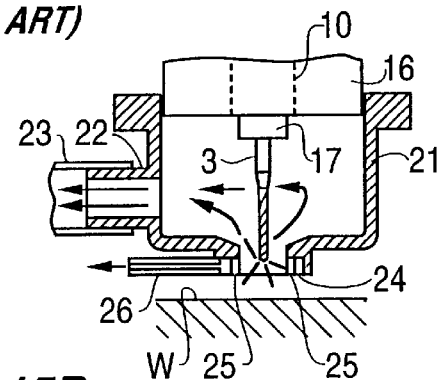
FIGS. 15A, 15B, 15C and 15D illustrate a conventional air jet method for bit cleaning a drill bit constructed in accordance with the present invention.
Figure 15B:
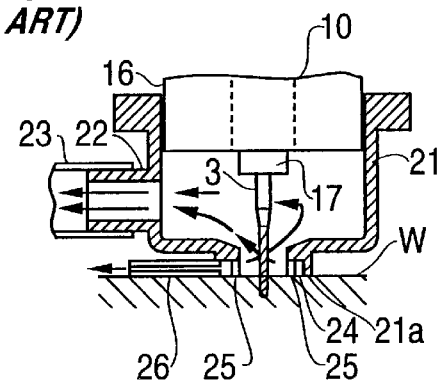
Figure 15C:
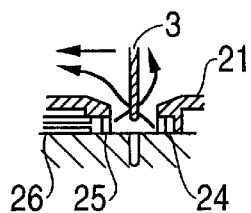
Figure 15D:
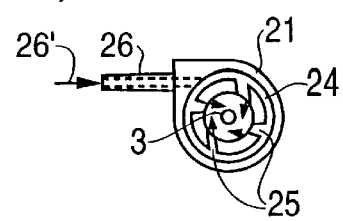

An air jet cleaning and cooling jet system of the type described, for example, in U.S. Pat. No. 4,915,550 and shown in FIGS. 15A–15D may be used in the drilling machine of FIG. 13 to clean a drill bit constructed in accordance with the principles of the present invention. More particularly, as shown in FIGS. 15A and 15B, a bearing 16 rotatably supports therein a spindle 10, with the spindle 10 supporting a chuck 17, and with the chuck being adapted to hold a drill 3. A pressure foot 21 fits the bearing 16 and is slidable in an axial direction of the bearing. Compressed air from a compressed air source (not shown) is supplied in the direction of the arrow 26' through the pipe 26 to a groove 24, and the inside of the pressure foot is scavenged by air exhausted through the outlet port 22. The compressed air source is constructed so that the pressure and/or flow rate of compressed air from the air source can be controlled manually or automatically. Air introduced over the end surface 21a of the pressure foot 21 flows in the direction of the arrows illustrated in FIG. 15B and is exhausted through the exhaust port 22 thereby cooling the drill 3.

When the bearing 16 is lowered to the position illustrated in FIG. 15B, the end surface 21a of the pressure foot 21 contacts the upper surface of the printed circuit board W, the compressed air supplied to the groove 24 through the pipe 26 is directed through the groove 25 into the interior of the pressure foot 21.

Figure 16A:
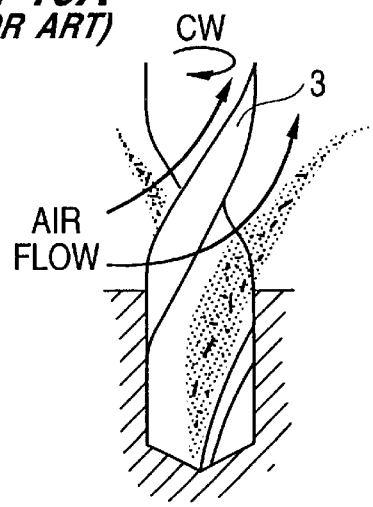
FIGS. 16A and 16B schematically depict chip flow along the flutes of a drill bit tip as the bit is removed from the workpiece.
Figure 16B:
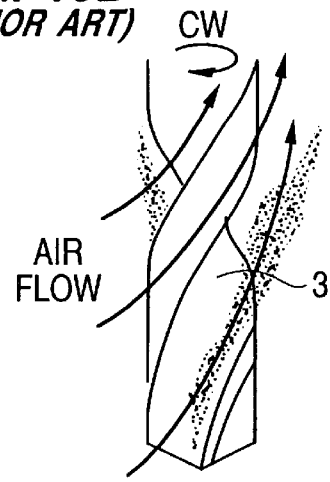
Figure 17A:
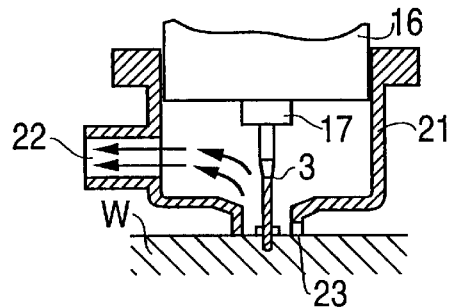
FIGS. 17A and 17B illustrate chip removal in a conventional, high speed/high aspect ratio drilling.
Figure 17C:
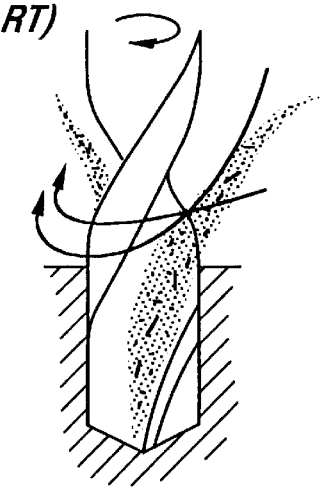
FIGS. 17C and 17D illustrate chip removal in the arrangement of FIGS. 17A and 17B.
Figure 17B:
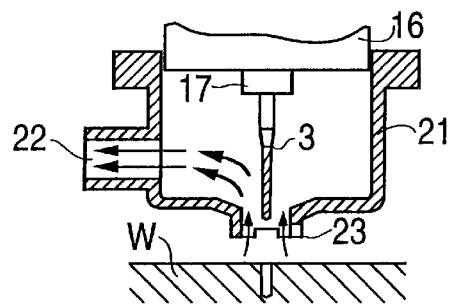
Figure 17D:
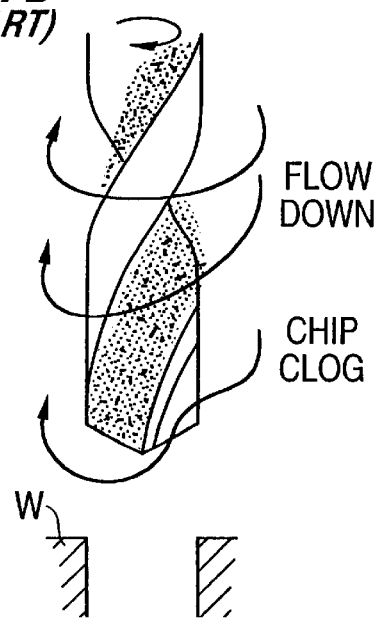

FIGS. 16A and 16B illustrate a rotation of the drill bit 3 in a clockwise direction whereas the air flow is directed around the drill 3 in a counterclockwise direction to dislodge the chips from the flute and, at the same time, cool the drill bit 3.

Figure 14A:
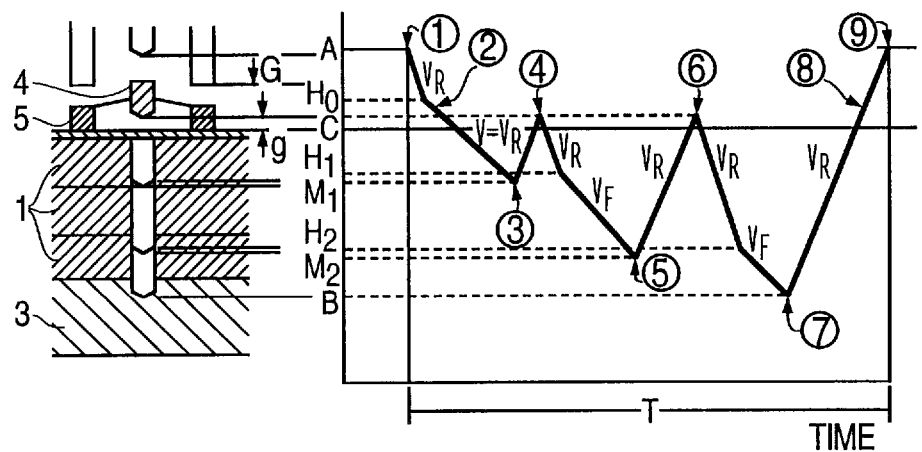
FIGS. 14A and 14B illustrate a step feed drilling utilized in the method of the present invention.
Figure 14B:
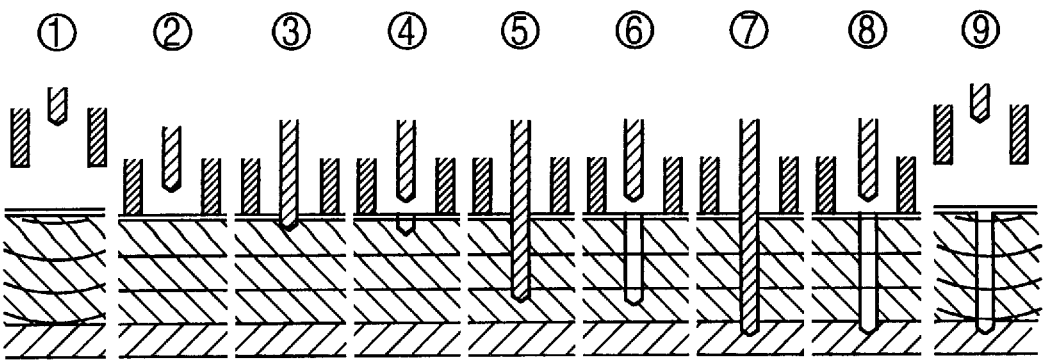

The foregoing system is used in conjunction with the step feeding method illustrated in FIGS. 14A and 14B but with the specific relationships described below in connection with FIG. 6 and with the drill bit shown in FIGS. 1 through 5 and also described below. Generally speaking for background information, the step feeding shown in FIGS. 14A and 14B involves a first drilling step where the workpiece is drilled to a depth $M_1$ (FIG. 14A) during steps ①–③, then the drill bit is withdrawn by a small amount g (FIG. 14B) during step ④, the workpiece is again drilled to a depth $M_2$ (FIG. 14A) during step ⑤, and so on.

Figure 6:
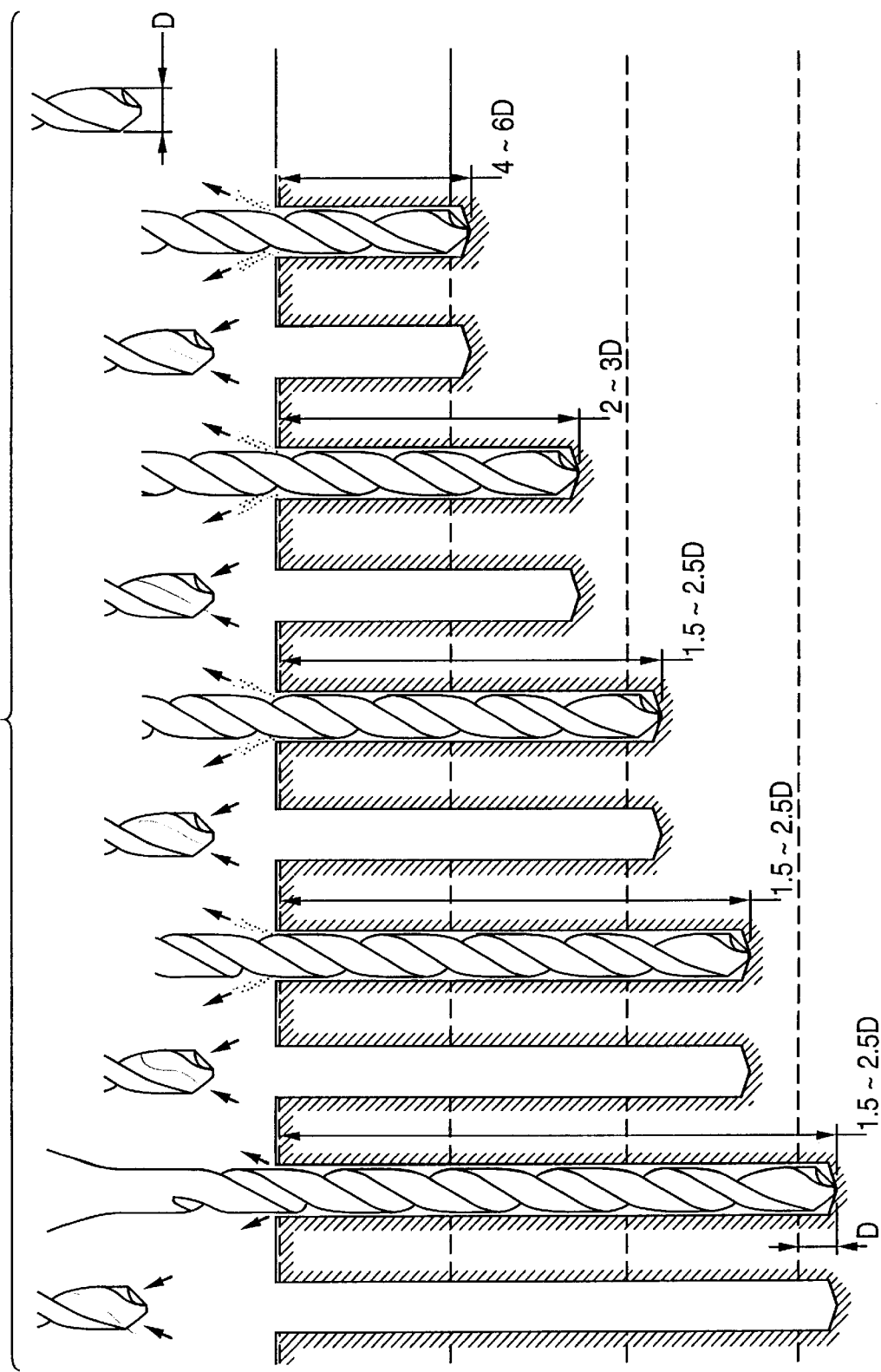
FIG. 6 illustrates how controlling the size of each drilling step decreases clogging in accordance with the method of the present invention.

More specifically, however, that when a drill bit made in accordance with the present invention is used for such a step feed drilling operation of a stack of PCBs each 0.063" thick, then as shown in FIG. 6 the first step should be between 4–6 D (where D is the drill diameter, e.g. 0.016"), and preferably 5D (e.g. 0.08" if the drill diameter is 0.016"), the second step should be between 2–3 D and preferably 2.5 D, (or 0.04" if the drill diameter is 0.016"), the third step should be between 1.5–2.5 D, and preferably 2 D (or 0.03" if the drill diameter is 0.016"), and any further steps should be between 1.5–2.5 D and preferably 2 D (or 0.03 inch if the drill diameter is 0.016 inch). With these drill parameters, no drill breakage has been observed, and improved hole positioning accuracy and hole quality have been attained.

FIGS. 1 through 4 show one embodiment of a high aspect ratio drill embodying the principles of this invention. For purposes of understanding what is shown in these figures, the following symbols are used:

D: Drill bit diameter
W: Minimum web thickness
$W_E$: Web thickness at whetstone feed end
F/L: Flute/land ratio
N: Relief groove depth
$\theta_P$: Point or tip angle
$\theta_F$: Flute or lead or primary cutting angle
$\theta_{FS}$: Flute angle at flute state, i.e., cutting corner (FIG. 12)
$\theta_{FE}$: Flute angle at flute end (FIG. 12)
$\theta_2$: Second cutting angle
$\theta_3$: Third angle
$\theta_c$: Chisel angle
$L_c$: Chisel length
$L_e$: Cutting edge length
$P_{TE}$: Taper end, whetstone feed end
$P_{FE}$: Flute end
$P_{BE}$: Body or shank end
$L_B$: Body length
$L_f$: Flute length
$L_A$: Maximum web thickness with relief In a high speed small diameter drill bit of the present invention, the drill diameter may be 0.016"; the web thickness W at the drill tip 15% of the drill diameter; the flute/land ratio 2.0; the point or tip angle $\theta_P$, 130°; the second cutting angle $\theta_2$, subtended between the flute tip surface and a plane S perpendicular to the longitudinal center axis R of the drill bit at the drill bit tip, 20°; the third cutting angle $\theta_3$, subtended between the flute edge surface and the plane S, 30°; the lead or flute angle $\theta_F$ 32°; relief groove depth NO.001", body length $L_D$ 0.256", and the distance between the body end and the flute end 0.01". At a location corresponding to a flute taper end, the flute area is only approximately 5% of the body cross sectional area. To overcome the difficulties resulting from a low Young's Modulus of K30, K20 or K10, materials having a higher Young's Modulus are used in the drill bit of the present invention. Furthermore, due to the transition portion between the flute end and body end, stress concentration is significantly reduced.

Figure 1:
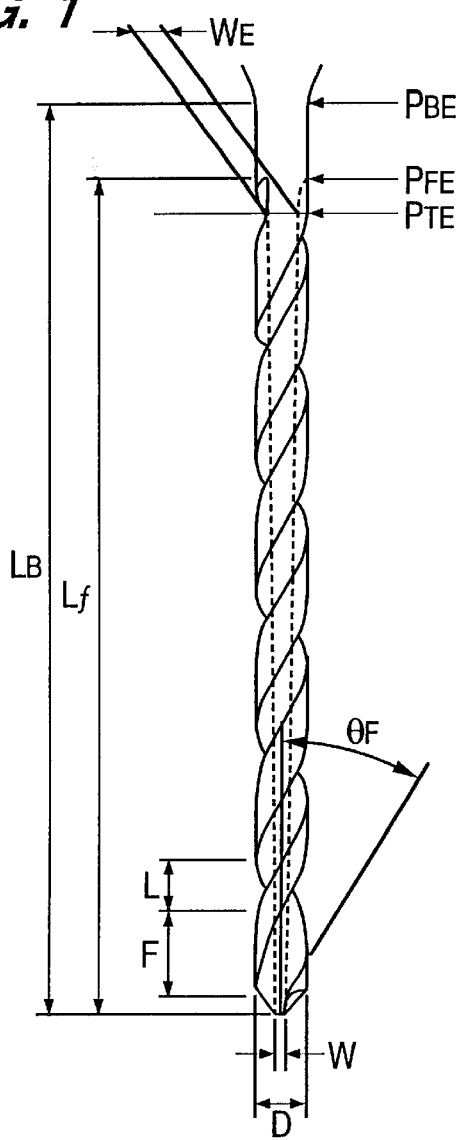
FIG. 1 is an elevational view of a drill bit constructed in accordance with the present invention.
Figure 3:
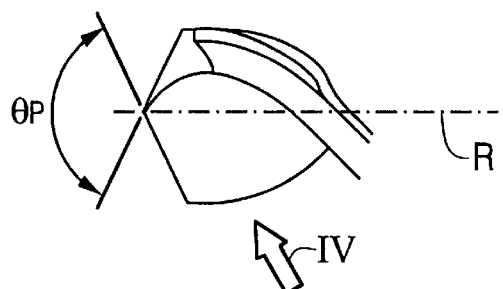
FIG. 3 is an isolated view of the tip of the FIG. 1 drill bit taken in the direction of arrow III in FIG. 2 and depicting the point angle $\theta_p$.
Figure 4:
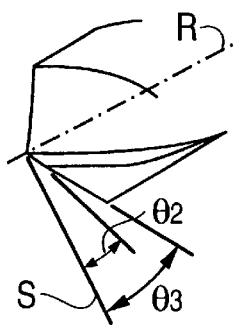
FIG. 4 is an isolated view of the FIG. 1 drill bit tip taken in the direction of arrow III in FIG. 3 and showing second cutting angle $\theta_2$ and third cutting angle $\theta_3$.
Figure 2:
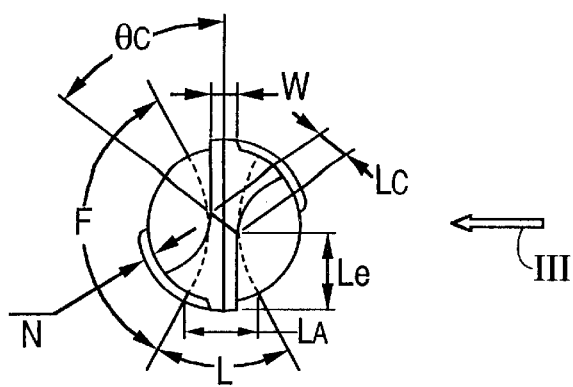
FIG. 2 is a bottom plan view of the tip of the drill bit shown in FIG. 1.
Figure 2A:
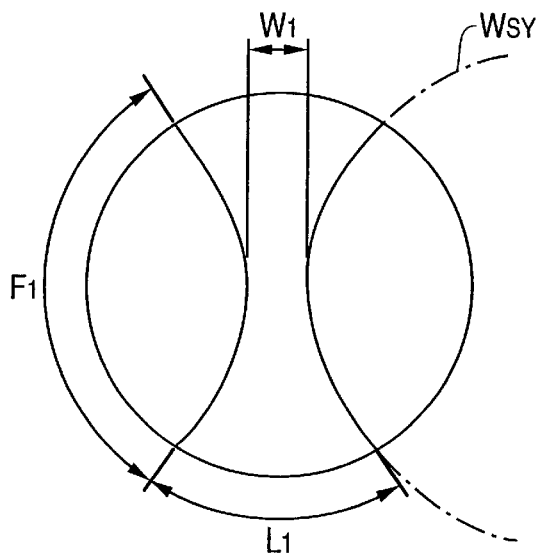
FIGS. 2A and 2C are bottom plan views of a drill bit similar to FIG. 2 but showing an approximately symmetrical round formed whetstone.
Figure 2B:
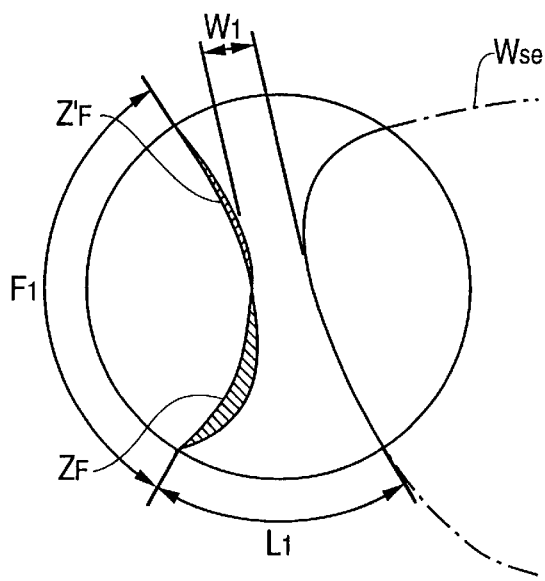
FIGS. 2B and 2D are bottom plan views of a drill bit similar to FIG. 2 but showing an unsymmetrical formed whetstone.
Figure 2C:
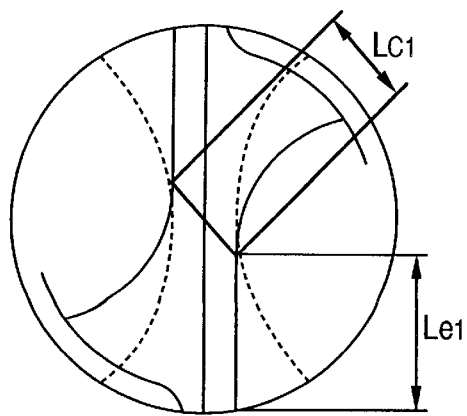
Figure 2D:
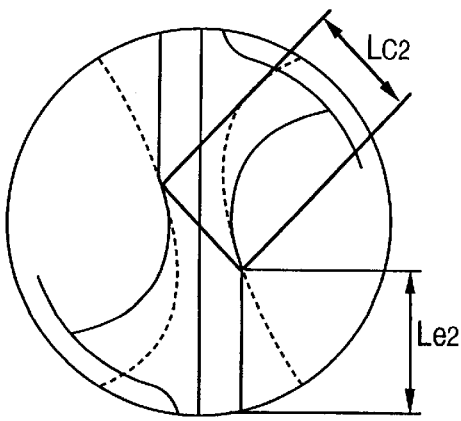
Figure 18A:
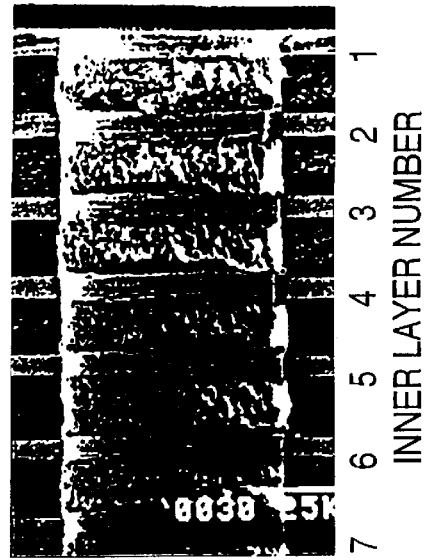
FIGS. 18A–18C illustrate the relationship between drill thrust load and hole depth.
Figure 18B:
Figure 18C:
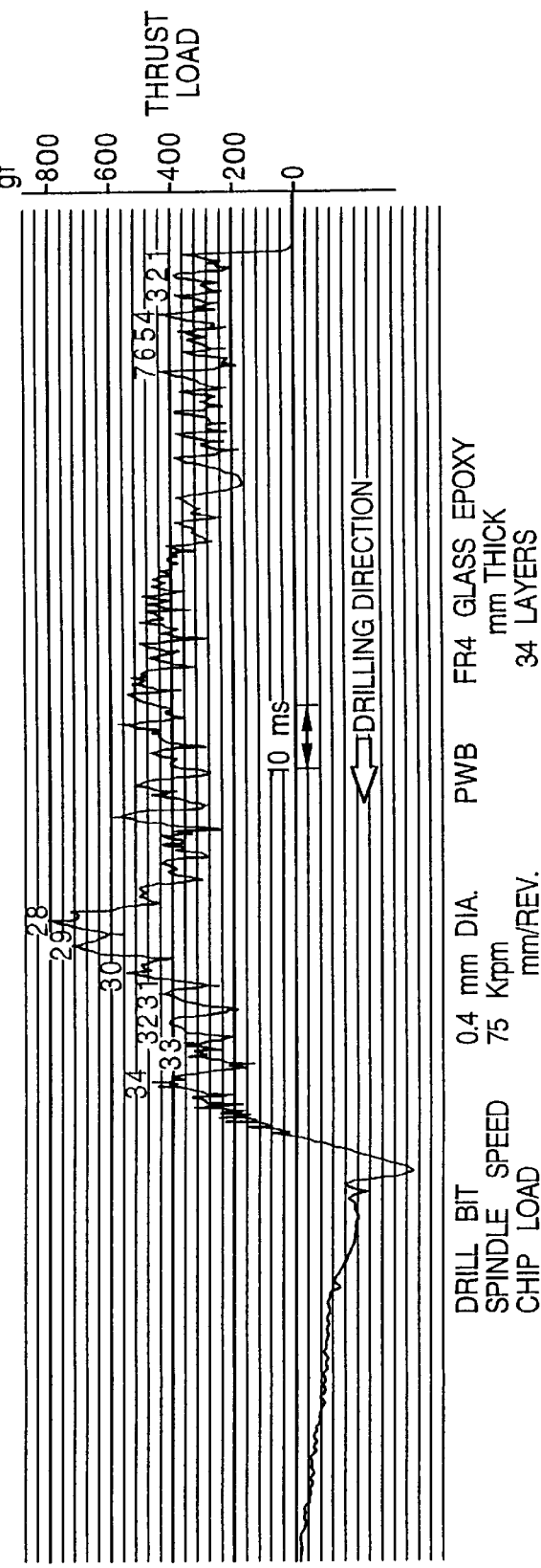
Figure 21:
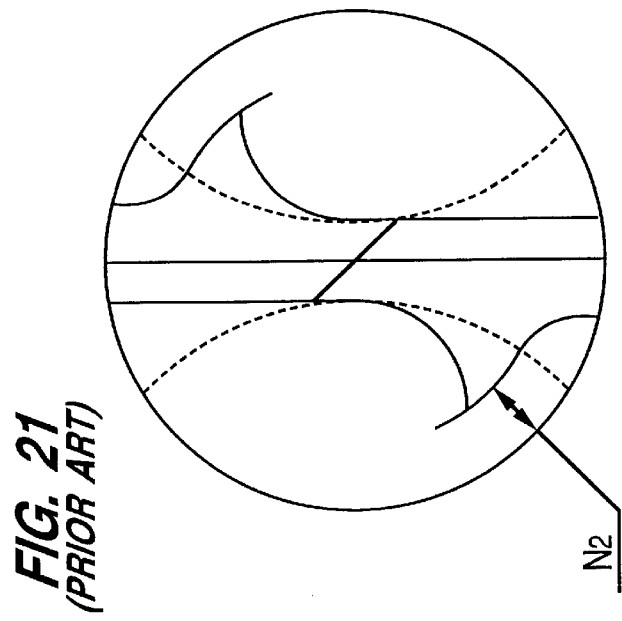
FIGS. 20 and 21 are bottom plan views of two different types of conventional drill bit tips.
Figure 20:
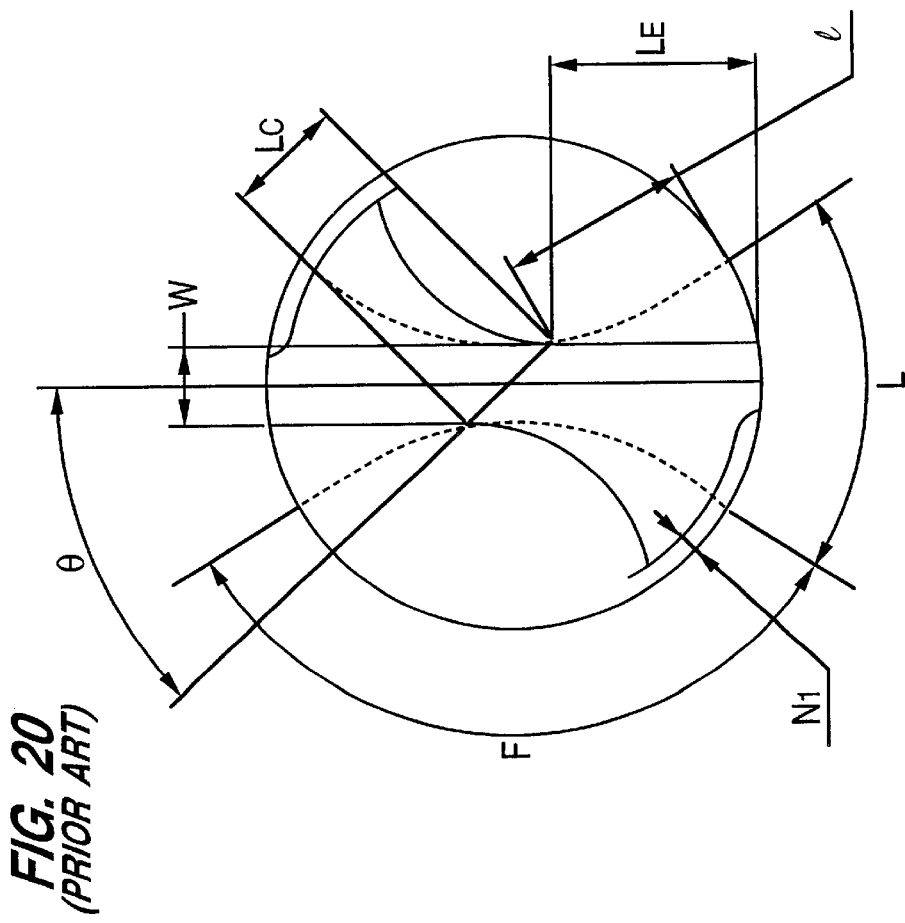

In the above described drill bit where the diameter size is 0.012" to 0.020", the flute shape is very effective for chip removal. This effect can be enhanced by increasing the drill bit cross sectional area, as shown in FIGS. 2B and 2D, where such cross sectional area is appropriate to the grinding whetstone surface shape. The area becomes larger by an amount of $(Z_A-Z'_A)$ in FIG. 2B than the drill bit of FIG. 2A even if the flute land ratios of both are the same, although the drilling thrust load is slightly increased because the chisel length $L_{c2}$ is slightly longer in FIG. 2D than the chisel length $L_{c1}$ of FIG. 2C and the cutting length $L_{e2}$ is slightly shorter in FIG. 2C than the cutting length $L_{e2}$ of FIG. 2E within a limited cutting length range range of less than 40% and chisel length of more than 30% respectively. As a result, hole quality (i.e., smear, roughness FIG. 18) are greatly improved, and drilling depth for each step can be increased to the maximum limit, such as 6D for the first step to 3D for the second step and to 2.5D for the third and further steps. In FIGS. 2A and 2B, $W_{sr}$, represents the approximate symmetrical round formed whetstone; $W_{se}$, represents an unsymmetrical formed whetstone; and $(Z_A-Z'_A)$ represents the flute cross section increase in value of an unsymmetrical flute drill bit with respect to approximately symmetrical flute drill bit.

This drill bit whose geometry is described in FIGS. 1–4 is further illustrated in FIG. 5. The web thickness tapers from the shaft (the thick portion) to the drill tip (the thinnest portion). The strength and rigidity of such a tapered-web drill is superior to that of conventional drill bits with substantially constant web thickness. Controlling the size of each step in the manner previously described with regard to FIG. 6, ensures that the drill flute will not become clogged at the bottom even if flute area is very small at the top.

With regard to the improvement in deflection versus bending load (FIG. 7) of the present invention in relation to the prior art (curves D and E), curve A represents the drill bit shown in FIGS. 1–5 using a linear land taper. Similarly, curve A in FIG. 8 shows the improvement in hole position error using a drill bit in accordance with the present invention as opposed to conventional drill bits (curves D and E).

It is within the scope of the present invention to use other than a linear land taper. For instance, a composite taper consisting of say two linear tapers (two examples are illustrated by solid line and dotted line in FIG. 9 where $l_{t1}$, $l_{t3}$ to are the first taper lengths, $l_{t2}$ to and $l_{t4}$ are the second taper lengths, and $l_f$ is the flute length to whetstone feed end), or a power-law taper $y=ax^n+b$ or $y=ax^{1/n}+b$ (as illustrated, respectively, by solid line and dotted line in FIG. 10) by varying radial feed rate and axial feed rate ratio of drill versus circular plate whetstone, where y= the web radius; and x= the distance from tip of drill.

Figure 7:
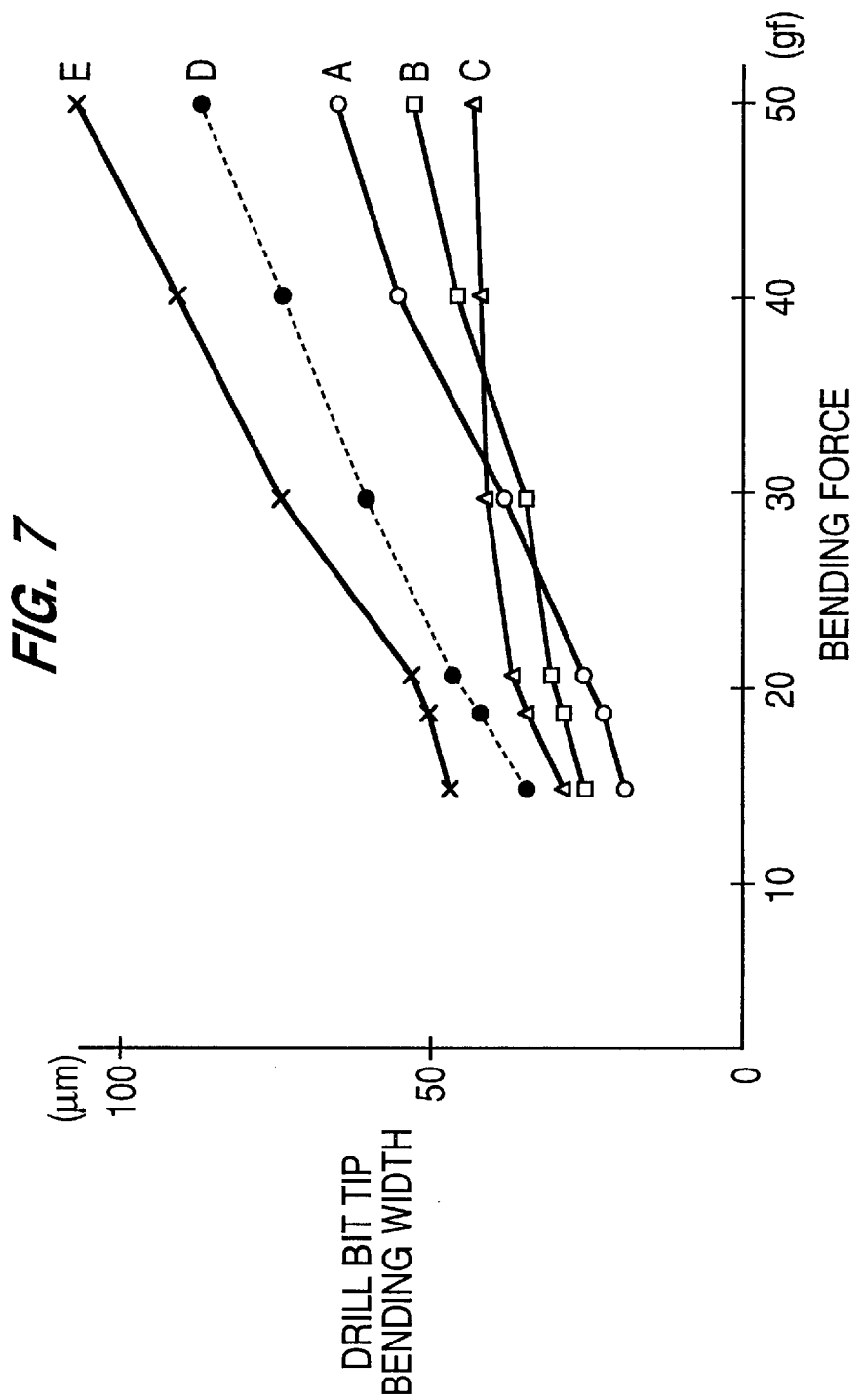
FIG. 7 is a graph showing the relationship between bending force and deflection of a drill bit tip.
Figure 8:
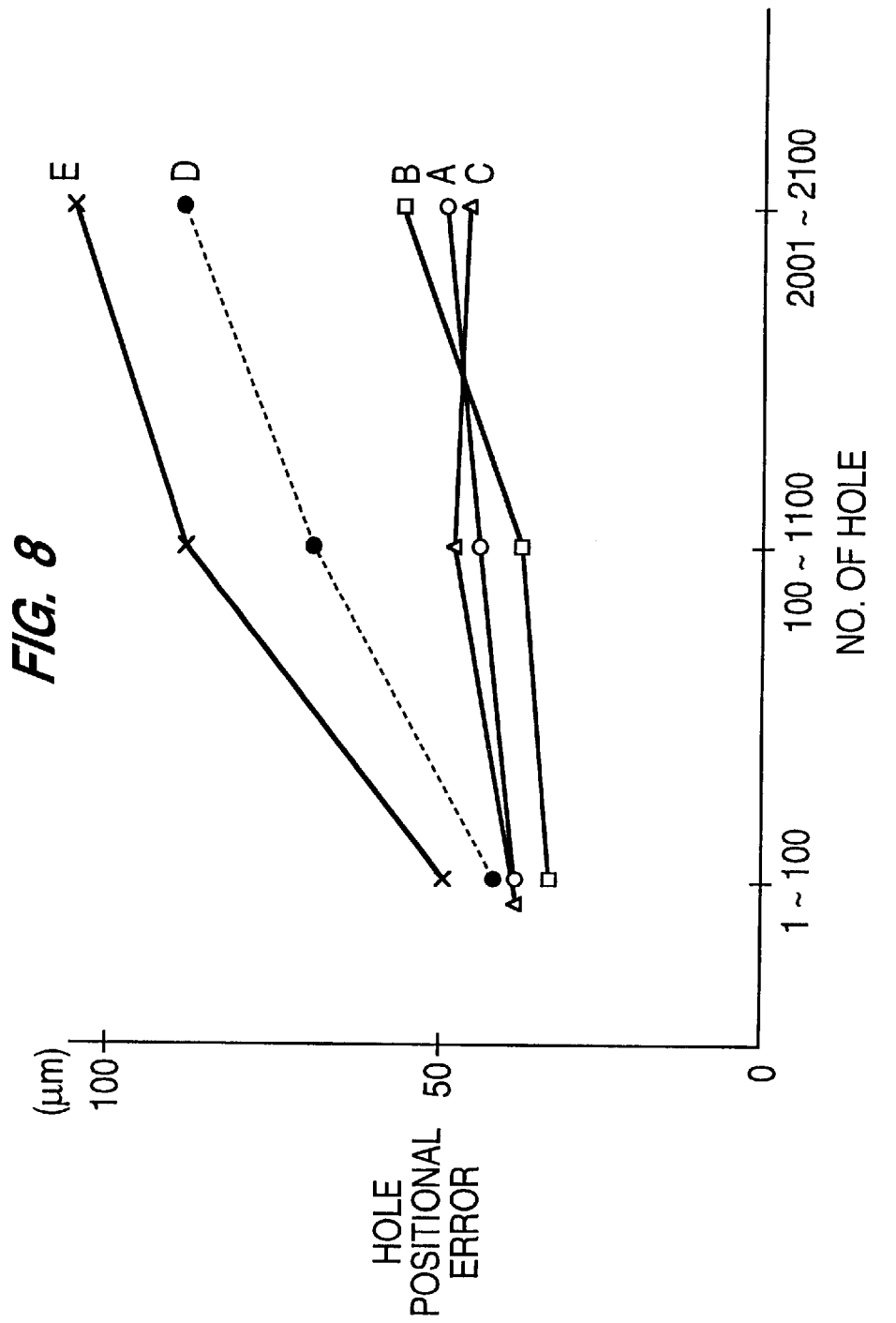
FIG. 8 is a graph showing the relationship between the number of holes drilled and the positional error of the holes.
Figure 11:
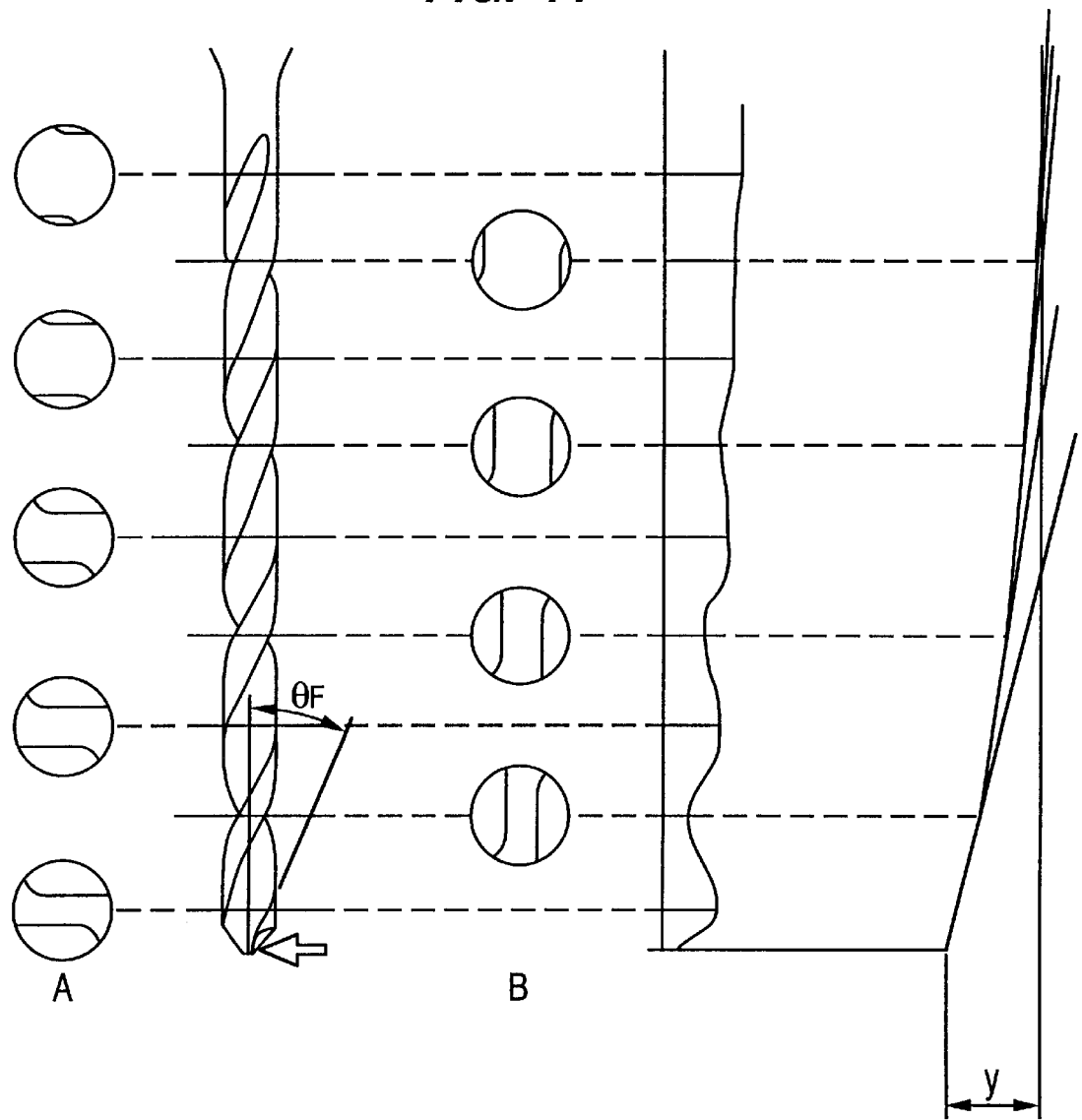
FIG. 11 is a view similar to FIG. 5 but in connection with a drill whose tip angle is 24°.

In another embodiment of the present invention shown in FIG. 11 and represented by curve B in FIGS. 7 and 8, the flute angle $\theta_F$ is reduced to 24° with the other aspects of the drill bit construction being essentially identical with the embodiment of FIGS. 1–4. As a result, the second moment of area goes through a minimum in the drill length only four times, increasing drill rigidity and improving hole positioning accuracy. We have found that this angle is particularly suitable for drilling double-sided boards.

Figure 12:
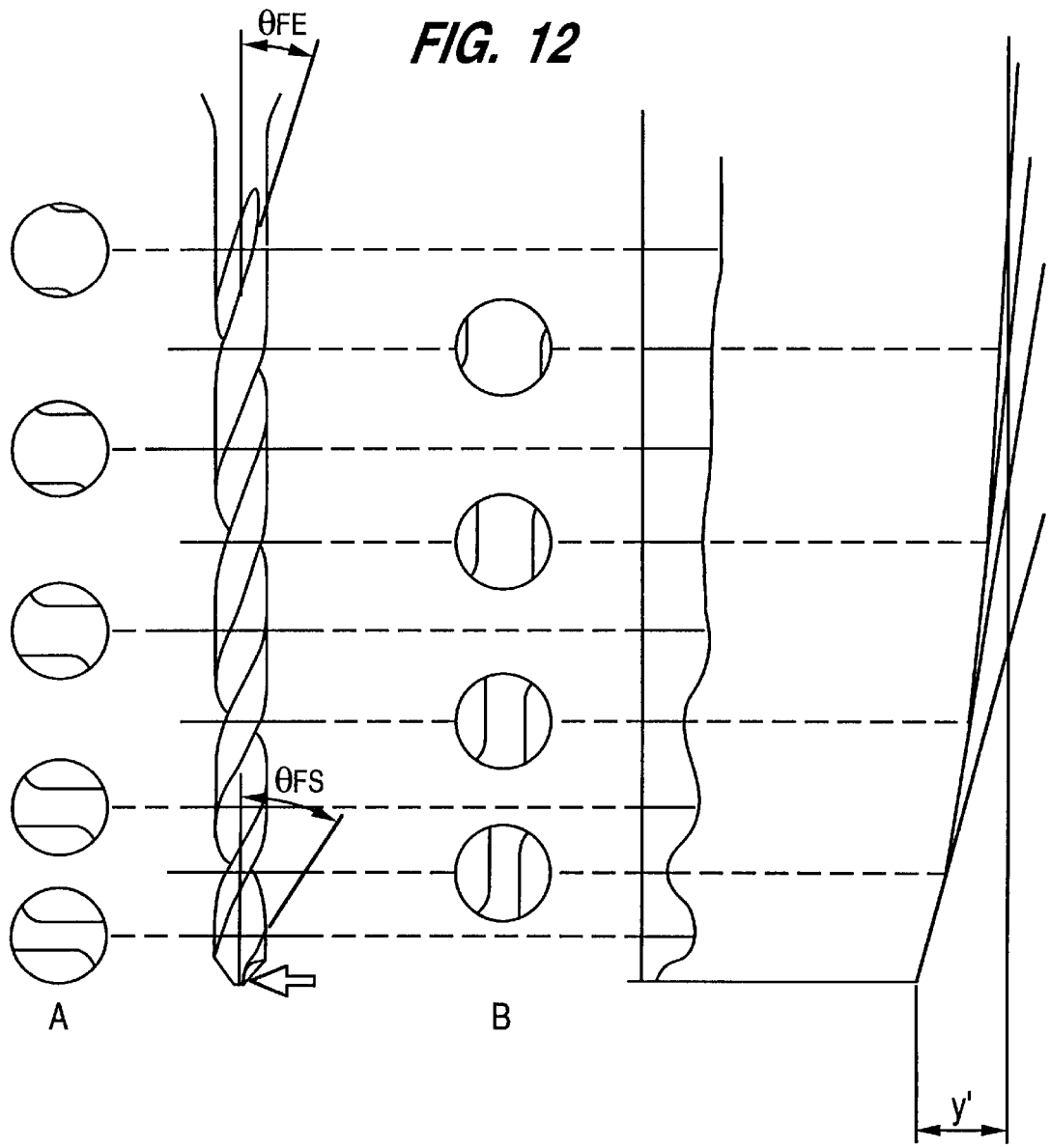
FIG. 12 is a view similar to FIG. 5 but showing the deflection of a drill bit whose flute angle at the flute start is 32° and whose flute angle is 20° at the flute end.

Alternatively, in the embodiment of FIG. 12, the flute angle $\theta_{FS}$ at the flute start is 32° and the flute angle $\theta_{FE}$ is 20° at the flute end to minimize deflection at the tip end. This embodiment is represented by curve C in FIGS. 7 and 8.

For a power-taper drill bit of the type used for reducing cutting edge wear, the flute angle $\theta_p$ is at 32°, but the angle $\theta_{FE}$ is decreased to 20° at the shank end by varying feed angle and axial feed ratio of drill to whetstone according to $y=ax^n+b$ (shown in solid line in FIG. 10), as described above.

The thrust load on the drill bit during a drilling operation depends on the tip angle $\theta_p$ and the flute or lead $_F$ angle, which create the cutting component, and the downward chisel force over an area which is a circle of diameter equal to the chisel length, $L_c$: (FIG. 2). On one hand, if the tip angle $\theta_p$, second cutting angle $\theta_2$ and third cutting angle $\theta_3$ are relatively large, then the chisel length $L_c$, (FIG. 2) can be as much as 40% of the drill diameter, and the thrust load on the drill bit becomes very large. This can result in drill breakage and board delamination. Also, because the cutting length $L_c$, is small, hole roughness and smear may occur. However, because the radial cutting component is small, the positional accuracy is improved. On the other hand, if the tip angle, and second and third cutting angles are relatively small, then the aforementioned problems disappear, but positional accuracy will become poorer.

We have found that for a PCB where positional accuracy is highest and thrust load is lowest in diameter between 0.012" and 0.020", the optimum web thickness is 10% to 28% of drill diameter, optimum flute/land ratio F/L is between 1.5 and 2.5, optimum tip angle $\theta_p$ is 118° and 140°, second cutting angle is 15° to 20° and third cutting angle is 25° to 30°, and flute angle is 20° to 35°. Optimum body length is 0.24" to 0.28", relief groove depth N is 0.001" to 0.002", the flute cross-sectional area is no more than 40% (preferably 25%) of the corresponding circle area at the taper end, and the optimum material is K10 or K20 material, and the distance between the body end and the flute end is 0.01" to 0.05".

We have found that the highest hole positional accuracy and the highest hole quality can be achieved by the optimum drill bit shape for a step feed drilling operation. More specifically, dimensional shapes for each drill bit size are optimized as follows. For example, in drill bits having a diameter between 0.012" and 0.020" for drilling 0.189" thick board (0.063" thick, three high boards), the optimum web thicknesses W are 10% and 28% of drill diameter. The above ranges are almost in inverse proportion to drill diameter, and a thinner web is better for hole quality but slightly poorer for hole accuracy. However, a thicker web is better for hole accuracy but slightly poorer for hole quality, and the drilling depth for each step tends to be shortened to minimum limits such as 4D for the first step, 2D for the second step and 1.5D for third and further steps, e.g., 12% to 23% is preferable for a 0.016" drill bit.

The optimum flute/land ratios F/L are between 1.5 and 2.5, and the above ranges are almost proportional to drill diameter. A smaller F/L is better for hole accuracy but each drilling depth step is shortened. A larger F/L is better for hole quality but yields slightly poorer for hole accuracy, e.g., 1.7 to 2.3 is preferable for a 0.016" drill bit.

The optimum flute cross sectional area/body cross sectional area ratios $F_a/B_a$ (FIG. 5) at the taper end are no more than 40%, the ranges are almost in inverse proportion to the drill diameter, and a smaller $F_a/B_a$ is better for hole accuracy but each drilling depth step is shortened, whereas a larger $F_a/B_a$ is better for hole quality but slightly poorer for hole accuracy, e.g., no more than 25% is preferable for a 0.016" drill bit.

The optimum flute lengths $L_f$ are between 0.22" and 0.28", and the minimum and maximum necessary flute length $L_f$(min). and $L_f$(max). can be represented from our experimental data for chip removing reliability as follows:

$$L_f(min)=T_b+D_b+N\times D$$

where $T_b$: Board thickness (FIG. 6);

$D_b$: Back up penetrating hole depth (FIG. 6);

e.g. $D_b$=0.012" (0.008"<D≦0.014");
$D_b$=0.016" (0.014"<D≦0.026");

N: a constant related to drill diameter, e.g. N=2.0 (0.008"<D≦0.022"), then: $L_{f(max)}=L_{f(min)}+0.04$" (0.126"<D≦0.189")

where, the constant 0.04" relates to good hole quality maintenance for chip removing reliability and for board thickness total error.

Consequently, a flute length of 0.23" to 0.27" is preferable for a 0.016" drill bit.

The optimum body lengths $L_b$ are between 0.23" and 0.29", minimum and maximum necessary body length $L_{b(min)}$ and $L_{b(max)}$ could be represented by our experimental data as follows:

$$L_{b(min)}=L_{f(min)}+0.01"$$

$$L_{b(max)}=L_{f(max)}+0.01",$$

and $0.01"\leq L_b-L_f\leq 0.05"$ where, the constant 0.01" is related to the prevention of stress concentration at the body end. Consequently, 0.24" to 0.28" is a preferable body length for a 0.016" drill bit.

The optimum flute shape shown in FIG. 2B is most effective for better hole quality and better hole accuracy because the drilling depth for each step tends to increase as it does for a drill bit with a larger flute/land ratio F/L.

The optimum flute angle is between 20° and 35°. A smaller flute angle is effective for better hole accuracy for double sided board or lower layer multilayer board but poorer wearness of cutting edge. A larger flute angle is effective for better hole quality for high density multi-layer board but slightly poorer for hole accuracy. Flute angle ranges are almost proportional to drill bit diameter, e.g., smaller diameter drill bits are between 20° and 33°, larger diameter drill bits are between 24° and 35°, and between 23° and 33° is preferable for a 0.016" drill bit. In a drill bit with varying flute angle, the flute angle $\theta_{FS}$ at the flute start should be between 18° and 26° and the flute angle $\theta_{FE}$ at the flute end should be between 28° and 35°, and in a 0.016" drill bit, a $\theta_{FS}$ between 18° and 22° and a $\theta_{FE}$ of between 29° and 33° are preferable.

The optimum point angle $\theta_p$ is between 118° and 140°. A smaller point angle is effective for better hole quality but poorer for hole accuracy because of an increase in the radial component of the drilling force. A larger point angle is effective for better hole accuracy but slightly poorer for hole quality, because the thrust component of the drilling force increases. Therefore, an optimum point angle between 125° and 140° is preferable for a 0.016 drill bit.

The optimum second cutting angle $\theta_2$ is 15° to 20°, and optimum third angle $\theta_3$ is 24° to 30°. These angles increase and decrease roughly proportional to the drill diameter, e.g., smaller $\theta_2$ and $\theta_3$ are useful for smaller size drill bit, because the cutting edge is strengthened but are slightly poorer for hole quality at a high speed feed rate range. A larger $\theta_2$ and $\theta_3$ is useful for a larger size drill bit because cutting edge weakness is not significantly affected and they are also better for hole quality.

The optimum relief groove depth N is between 0.001" and 0.002" and is almost proportional to drill bit diameter, e.g., an N of between 0.001" and 0.0015" is useful for no more than 0.020" size drill bit (between 0.001" and 0.013" is preferable), an N of between 0.0012" and 0.002" is useful for a larger size drill bit, and an N is not useful in drill bits above 0.08". Drill bit with dotted line taper of FIG. 9 and FIG. 10 have almost similar tendency for hole accuracy, for hole quality and for drilling depth step as a larger $F_a/B_a$ ratio drill bit, however, solid line taper of FIG. 9 and FIG. 10 have almost an inverse tendency to above.

The above described drill bit shape relates to a drill bit with a diameter between 0.012" and 0.020", preferably 0.016", for drilling a 0.189" thick board. However, we have also found that in other size drill bits of no more than 0.012" in diameter for 0.063" and 0.126" thick board (0.063" thick for two high boards), and more than 0.020" in diameter for 0.126" and thicker boards, the optimum drill bit shapes have almost the same dimensional properties for high hole accuracy and high hole quality when used in combination with step feed drilling and air jet chip cleaning. K20 material is useful for better hole accuracy less than 0.02" in dia. for its high Young's modulus. K20 material is more useful for better accuracy more than 0.014" for its higher Young's modulus but lower transversal rupture strength.

The present invention as above described provides an optimum drill bit shape for a step feed drilling method and an air jet chip cleaning method. As a result, drill bits for drilling high aspect ratio hole have improved reliability (i.e., no drill bit breakage), improved accuracy (hole position accuracy), hole quality and productivity. Furthermore, circuitry density (i.e. the number of conductor lines/grid) for PCBs can be increased from between one to two lines/grid to three to five lines/grid because it is now possible to drill smaller, high quality holes. In addition, the number of inner/layers and hence the board thickness can significantly increase allowing the production of high density MLBs (multi-layer boards).

The present invention offers remarkable improvements such as higher processing speed and a more stable noise margin. Moveover, dimensional minimization of apparatus for large scale computers and other electronic products can be largely improved by these boards.

While we have shown several embodiments in accordance with the present invention, it is to be understood that the same is susceptible of changes and modifications once made available to one skilled in this art. Therefore, we do not intend to be limited to the details shown and described herein but intend to cover all such changes and modifications as are encompassed by the scope of the appended claims.

We claim:

1. A drill bit for high speed, high aspect ratio drilling, the drill bit comprising a drill bit body having a body end, a tapered flute, a flute end, a point angle between 118° to 140°, a second cutting angle, subtended between a flute tip surface and a plane perpendicular to the drill bit body longitudinal axis, of between 15° and 20°, a third cutting angle, subtended between a flute edge surface and said plane, of between 25° and 30°, and a flute angle of between 20° and 35°.

2. The drill bit according to claim 1, wherein the distance between said body end and said flute end is about 0.01".

3. The drill bit according to claim 2, wherein said drill bit body has a length of between 0.25" and 0.28".

4. A drill bit according to claim 1, wherein the distance between the body end and the flute end is between 0.01" and 0.04", the body has a length between 0.25" and 0.28", and the body has a tapered end axially spaced along the body of the bit from the flute end.

5. A drill bit for high aspect ratio holes, the drill bit comprising a drill bit body having a composite taper, a tip angle between 118° and 140°, a second cutting angle, subtended between a flute tip surface and a plane perpendicular to the drill bit body longitudinal axis, of between 15° and 20°, a third cutting angle, subtended between a flute edge surface and said plane, of between 25° and 30°, and a flute angle of between 20° and 35°.

6. A drill bit according to claim 5, wherein the composite taper is formed of two linear tapers.

7. A drill bit comprising a drill bit body having a web with a predetermined taper and web thickness, a point angle of between 118° and 140°, a second cutting angle, subtended between a flute tip surface and a plane perpendicular to the drill bit body longitudinal axis, of between 15° and 20°, a third cutting angle, subtended between a flute edge surface and said plane, of between 25° to 30° and a flute angle of between 20° to 35°.

8. A drill bit according to claim 7, wherein the taper is defined by the relationship:

$y=ax^n+b$, where:
y=web radius,
x=distance from tip of the drill bit, and
a, b and n are constants.

9. A drill bit according to claim 7, wherein the taper is defined by the relationship:

$y=ax^{1/n}+b$, where:
y=web radius,
x=distance from tip of the drill bit, and
a, b and n are constants.

* * * * *